April 5, 1966   J. J. PANDAPAS ETAL   3,243,866
METHOD OF MAKING A MINIATURE SLIP-RING ASSEMBLY
Filed Feb. 20, 1962   3 Sheets-Sheet 1
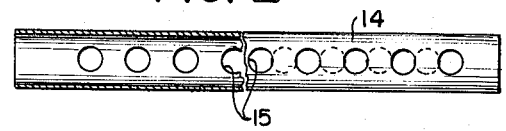
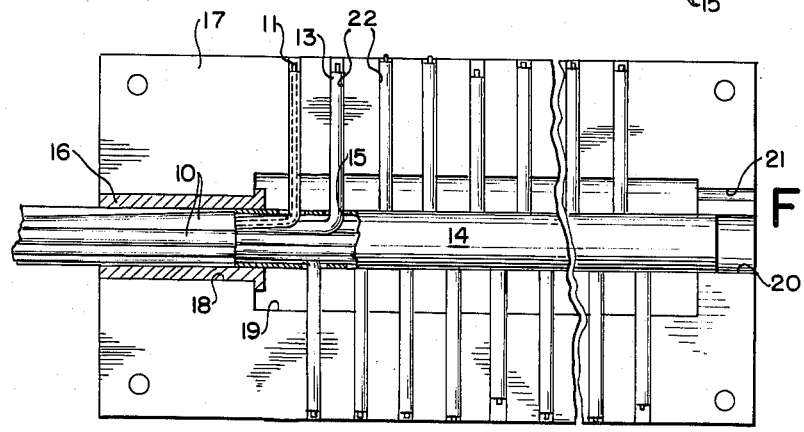
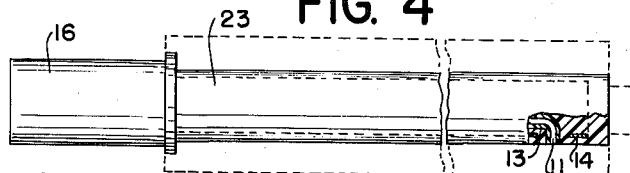
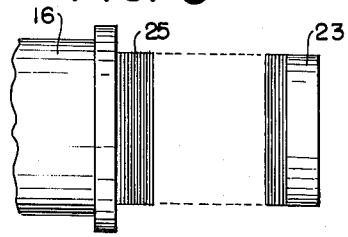
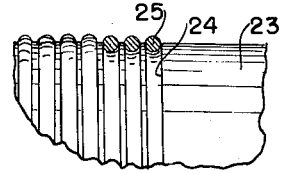
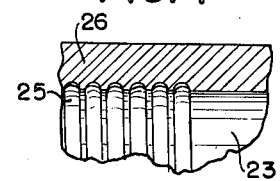
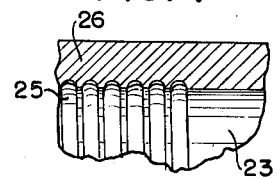
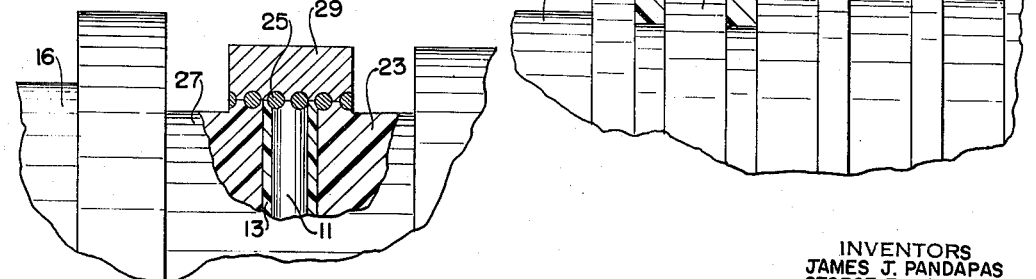
INVENTORS
JAMES J. PANDAPAS
GEORGE E. WENDELL
ROBERT H. MILLER
BY Pennie, Edmonds, Morton, Barrows & Taylor
ATTORNEYS

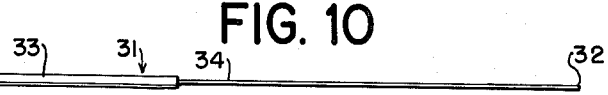
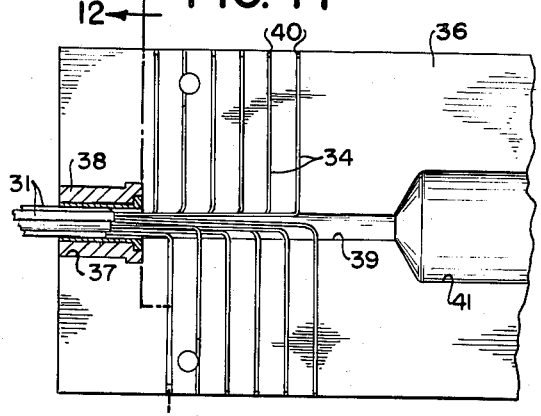
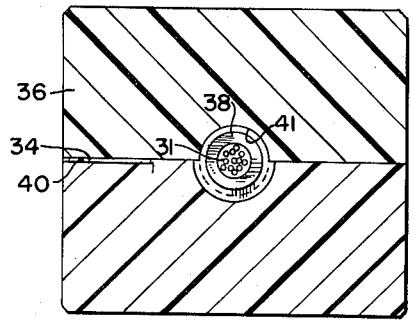
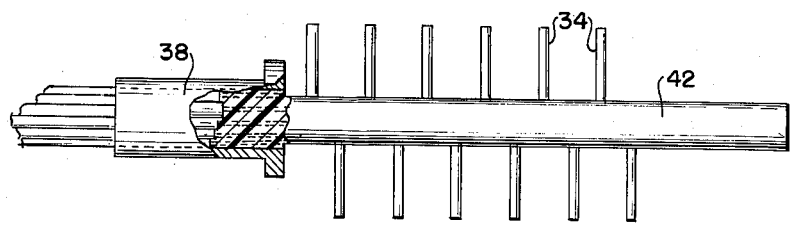
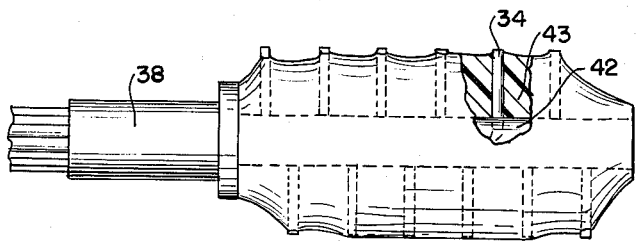
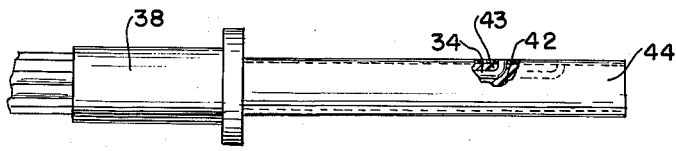

April 5, 1966 J. J. PANDAPAS ETAL 3,243,866
METHOD OF MAKING A MINIATURE SLIP-RING ASSEMBLY
Filed Feb. 20, 1962 3 Sheets-Sheet 3

INVENTORS
JAMES J. PANDAPAS
GEORGE E. WENDELL
BY ROBERT H. MILLER
Pennie, Edmonds, Morton, Barrows & Taylor
ATTORNEYS … # 3,243,866
METHOD OF MAKING A MINIATURE SLIP-RING ASSEMBLY
James J. Pandapas, George E. Wendell, and Robert H. Miller, Blacksburg, Va., assignors to Poly Scientific Corporation, a corporation of Delaware
Filed Feb. 20, 1962, Ser. No. 174,574
9 Claims. (Cl. 29—155.5)

This invention relates to slip-ring assemblies and to the method of making the same. More particularly it relates to a miniature slip-ring assembly having more uniform slip rings which are formed on a cylindrical member of substantially uniform diameter. It further relates to internal structurally reinforced slip-ring assemblies and to the method of making such assemblies.

In the manufacture of slip-ring assemblies, particularly of the miniature type, it has always been difficult to maintain close dimensional tolerances on a production scale and nevertheless realize a structure which has sufficient mechanical strength and heat-resistant properties to withstand extended use. It is a purpose of the present invention to provide a method by which slip-ring assemblies can be accurately and economically produced on a production scale, and also to provide a slip-ring assembly which has greater structural integrity than has previously been achieved with such assemblies.

Heretofore, a typical method of constructing slip-ring assemblies often included the initial step of providing an internal longitudinally extending mandrel and positioning it axially within the assembly to provide internal structural support. The use of such a mandrel presented major difficulties in accurately locating the mandrel within the center of the assembly as well as sufficient use of reinforcing material because it is positioned on the neutral axis. An added disadvantage of positioning the reinforcing member axially within the assembly was the inclusion of excessive bulk in a structure where diameter dimension is so critical. Among the attempts which have been made to eliminate the use of such internal mandrels, the majority of the slip-ring assemblies presently in use rely upon thermosetting plastic body members for their structural integrity. Many of the slip-ring assemblies are constructed of molded thermosetting plastic bodies having an internal axial bore and circumferential grooves formed on the outer surface thereof. Individual lead wires are threaded through the bore and out through an aperture opening into the circumferential grooves. After securing the lead wires in that position, for example by injecting a thermosetting resin internally into the bore, the ring material would have to be electrodeposited in the circumferential grooves.

Assemblies of this type have proven unsatisfactory for two principal reasons. First, the structural member formed by the lead wires and resinous plastic is out of balance, which results in a non-linear thermal expansion. This difference in thermal expansion usually causes distortion of the end product when subjected to elevated temperatures and this, coupled with the poor structural support (since the assembly lacked any internal reinforcement), often resulted in mechanical distortion of the product during the remainder of the assembly steps as well as during eventual use. Secondly, it has been found that it is difficult to electrodeposit a uniform deposition of material into grooves. It often happens that when small deposits of electrolyte become trapped within the grooves, they subsequently tend to corrode the assembly internally.

Broadly stated, the method of the invention consists of grouping a plurality of insulated lead wires together substantially side-by-side and extending the end portions of the wires outwardly from one end region of the group such that said end portions are spaced axially from each other. A dielectric substrate coating is applied to said end region of the group, and the end region and wires are then reduced to a cylindrical member of substantially uniform diameter such that the ends of the wires are exposed at the surface of the cylindrical member. A conductive slip-ring material is then applied on the cylindrical member. Circumferential grooves are cut through said material between adjacent wire ends to expose the substrate and thus form slip rings circumferentially disposed about the body member and electrically connected to the respective wires. Preferably, the grooves are then filled with a dielectric material to form insulating rings and the assembly is further formed to its finished size.

The invention further contemplates a slip-ring assembly which, also broadly stated, consists of a plurality of lead wires grouped substantially side-by-side with their respective end portions from one end region of the group extending outwardly from the group and spaced axially from each other. A substantially cylindrical dielectric substrate body member of substantially uniform diameter is solidified about the wires to hold them in the relationship just described with the ends of the wires exposed at the surface thereof. Slip rings are circumferentially disposed about the body member and are electrically connected to the wire ends. Insulating rings are disposed about the substrate member between the respective rings.

One improvement in applicant's invention involves forming the dielectric substrate body member in a single step (thus eliminating several steps in the production), as well as providing a body member formed from one material and thereby possessing a single coefficient of thermal expansion. A further improvement provides containing the lead wires within a substantially tubular thin-walled reinforcing member of at least one piece and applying a dielectric substrate coating to the thus-arranged wires and about the reinforcing member. This reinforcing member can be either truly tubular in form with openings formed in the side walls thereof for the outward extension of the individual lead wires, or alternatively could be formed of a longitudinally split tube so that the wires can extend outwardly between the opening defined by the split tube. Use of this tube as a reinforcing member removes the structural material from the neutral axis. This, combined with its efficient shape as a structural member, gives a more efficient usage of the reinforcing material. Moreover, after the individual wires are inserted axially into the reinforcing member and extended radially outwardly therefrom, the thus-arranged reinforcing member and wires can be submitted to a coating operation in which a resinous substrate body member is formed thereabout. Thus, the resultant assembly has an improved structural reinforcement as well as a substrate body member formed of a single material with one coefficient of thermal expansion.

A further improvement of the invention consists of a novel manner of providing a conductive surface on the substrate body member. I have found that by forming a closely spaced helical groove on the outer surface of the substrate core member and subsequently serving a winding of a small diameter conductive wire into the grooves, a very adequate conductive surface is provided. Furthermore, after the ring material is electroplated on such a conductive surface, even high shearing forces will not separate the deposited ring material from the substrate body member, for the helical wires disposed within the grooves present a true mechanical bond between the deposited material and the body member. Moreover, according to the invention the ring material can be electrodeposited onto a relatively smooth electrical surface, as opposed to many former methods of the electrodepositing into grooves, and thus a more uniform deposition of material can be formed on the body member.

A preferred embodiment of the slip-ring assemblies of the invention is described hereinbelow with refreence to the drawings wherein:

FIG. 1 is a side elevation partly in section showing a single lead wire of the plurality of such wires incorporated in the assembly;

FIG. 2 is a side elevation partly in section and partly broken away of the tubular reinforcing member of the asesmbly;

FIG. 3 is a plan view partly in section and partly broken away of the lead wires and reinforcing member of the assembly positioned in a mold;

FIG. 4 is a side elevation partly in section and partly broken away of the assembly after formation of the dielectric substrate body member thereon;

FIG. 5 is a side elevation on an enlarged scale showing an electrically conductive wire helically wound about the substrate body member of the assembly;

FIG. 6 is a fragmentary side elevation partly in section showing the position of the electrically conductive helically wound wire of FIG. 5 in a still larger view;

FIG. 7 is a fragmentary enlarged view substantially as shown in FIG. 6 showing slip-ring material deposited on the substrate body member and about the helical wires;

FIG. 8 is a fragmentary enlarged view substantially on the scale of FIG. 7 showing the slip rings formed by cutting circumferential grooves through the ring material between adjacent wire ends and exposing the substrate body member;

FIG. 9 is an enlarged fragmentary view on a smaller scale than FIG. 8 showing a side elevation of a finished slip-ring assembly with dielectric material deposited between axially spaced rings;

FIG. 10 is a side elevation of a lead wire of the type used in the second embodiment of the invention;

FIG. 11 is a plan view partly in section showing a plurality of lead wires of FIG. 10 grouped in a mold;

FIG. 12 is a section taken substantially along the lines 12—12 of FIG. 11;

FIG. 13 is a side elevation partly in section of the assembly after being coated with its first dielectric coating in the mold;

FIG. 14 is a side elevation partly broken away of the assembly after being coated with a second dielectric coating;

FIG. 15 is a side elevation partly in section showing the assembly of FIG. 14 being reduced in diameter to form the substrate body member;

Figure 16:
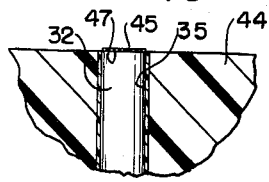
FIG. 16 is an enlarged fragmentary section of an end of a lead wire which is exposed on the surface of the substrate body member of the assembly and which has been coated with an electrodeposit of conductive material.

Referring initially to FIGS. 1 through 9, a first embodiment of the slip-ring assembly and method of forming the same is shown. A plurality of lead wires 10 of the type shown in FIG. 1 are used in the slip-ring assembly. The number of lead wires used in an assembly is usually determined by the number of slip rings to be formed on the slip-ring assembly. The wires 10 consist of a conductor 11 which is provided with an insulated jacket 12 along the major length of the wire with the exception of an end portion thereof along which the jacket 12 has been stripped off the conductor 11. In this embodiment a dielectric tube 13, formed of "Mylar" or other insulating material, has been threaded onto the insulated portion of the wire to provide adequate insulation from shorts occurring between adjacent wires. A plurality of lead wires 10 are grouped together side-by-side. The grouped wires are then inserted either individually or several at a time into a reinforcing thin-walled tubular member 14. The tubular member 14 as best shown in FIG. 2 consists essentially of a cylindrical metallic member which has openings 15 cut into the side wall on opposite sides thereof which are axially spaced substantially equidistant from each other.

One method of forming such a reinforcing tubular member in an economical way and with accurate small dimensions (e.g. 0.125 inch I.D., 0.135 inch O.D. and 0.005 inch wall thickness) has been to plate a solid aluminum wire of say 0.125 inch diameter with first a deposit of chromium and subsequently with a silver deposit until the diameter of the plate aluminum wire is at the diameter of the tubular member desired and also has a desired wall thickness. The thus plated aluminum wire then has openings 15 drilled through the chromium and silver plate. After this drilling operation the aluminum can be etched out in an alkaline solution such as lye, thus providing a very accurate reinforcing thin-walled tubular member 14 such as shown in FIG. 2.

By way of example, a flanged collar 16 is inserted over the tubular member 14 and slid therealong so that only an end portion of the tubular member is inserted within the collar. The collar 16 serves to maintain the lead wires as grouped in their proper longitudinal extension. After wires 10 have been inserted into the tubular reinforcing member 14 with the dielectric-insulated portion of the wires threaded through opens 15 and extending outwardly from the reinforcing member 14, the assembly is inserted into a mold 17 such as shown in FIG. 3. (Only one-half of the mold 17 is shown in FIG. 3 but a similarly constructed matching half would be inserted over the half shown.) The two halves of the mold, when joined, define an axial bore having a stepped diameter which extends through the mold 17. A first portion 18 is provided with a diameter sufficient to hold the collar 16 in a fixed position. A second portion 19 has a diameter larger than the first portion 18 and substantially circumscribes the longitudinal extent of the reinforcing member 14 when it is inserted therein. A third portion 20 is provided at the end of the mold opposite to the end at which the first portion is formed and opens into the second portion. The tubular member 14 has its end portion mounted in portion 20 so as to maintain it substantially concentrically aligned within the second portion 20. Also opening into the second portion 20 is an injection aperture 21. Extending substantially radially outwardly from the second portion 19 and axially spaced therealong are positioned slots 22. The positioning slots 22 are provided to maintain the insulation-coated end portion of the wires 10 extending radially outward from the reinforcing member 14 and axially spaced substantially equidistant from an adjacent radially extending wire 10. As shown, the openings 15 in the reinforcing member 14 are provided such that the wires 10 extend outwardly therefrom in diametrically opposed directions and are positioned axially such that each of the wires extending from the reinforcing member are axially spaced from any other wire extending therefrom regardless of which side of the reinforcing member 14 they extend from.

After the assembly is arranged in the mold as described, a thermosetting resin is injected through the third portion 20 of the bore of the mold and through the injection aperture 21 to substantially surround the reinforcing member 14 and maintain the wires 10 in their described position, as well as to become incorporated within the reinforcing member and about the wires grouped therein. Although many thermosetting resins are suitable, and possibly various ceramic materials might also prove feasible, the resin favored in this application is an epoxy resin. Epoxy resins are preferred principally because of their superior adhesion properties, and their structural integrity. After the resin is cured a dielectric covering is formed about the reinforcing member substantially as indicated by the dotted lines in FIG. 4. The assembly is then machined down to the diameter shown in FIG. 4 to provide a substrate body member 23 which has a substantially cylindrical shape with the end portions of the conductor 11 exposed on the surface of the body member. It is clear that an assembly formed in this manner has very adequate structural support in the form of the metallic reinforcing member 14 as well as sufficient electrical insulation between the respective wires and the metallic reinforcing member such that there is no danger of short circuiting within the assembly. It is noteworthy that although the casting of the body member 23 about the reinforcing member 14 is preferred, the reinforcing member 14 could also be cemented to a body member with a suitable adhesive, such as an epoxy adhesive.

In order to form slip rings about the structure body member 23 it is necessary to provide a conductive surface about which the slip-ring material can be electrodeposited. Although there are several ways of forming such a surface, in this embodiment a closely spaced helical groove 24 is cut into the surface of the substrate body member 23 as best shown in FIG. 6. A small-diameter electrically conductive wire 25 is then served onto the substrate body member 23 and positioned within the helical groove 24. As shown in FIG. 8 it is desirable to have at least two turns of these wires 25 contact the end of the conductor 11 which is exposed on the surface of the substrate body member 23. Then, using the leads as the cathode connection, the desired slip-ring material 26 (for example gold or silver) is electrodeposited on the conductive surface defined by the helically wound wires 25. As shown in FIG. 7, the wires 25 and the grooves 24 are of such a diameter that the wires extend outwardly on the surface of the substrate body member 23 to provide an irregular but substantially cylindrical surface. Thus, not only can slip-ring material be electrodeposited thereon, but also the turns of the raised wires 25 provide a very satisfactory structural connection between the ring material 26 and the substrate body member 23. This structure particularly provides a strong resistance against weakening by a possible shearing force between the ring material 26 and the body member 23.

It is also intended that the wire may be wound in other than a helical pattern. Moreover, metallic strips could be substituted for wire and either the wire or strips can be wound thereon without prior grooving. Other methods would include wrapping wire or metallic strips in bands.

After depositing the slip-ring material 26 on the assembly to a suitable thickness, the thus-formed assembly is then machined down to the desired thickness of the slip rings and circumferential grooves 27 are cut through the deposit 26 and the wires 25 between adjacent wire ends to expose the substrate body member and thus form slip rings 29 which are connected to the respective wires 10.

The assembly, with the slip rings 29 formed therein as described above, is then subject to a coating operation in which a deposit of a dielectric material is disposed about the assembly substantially as indicated by the dotted lines in FIG. 9. This can be done in a mold or by simply dip-coating if desired. The coated assembly is then machined down so as to remove all the dielectric material from around the slip rings 29 and thus leaving the epoxy insulation within the grooves 27 between the axially spaced rings 29 to form insulating rings 30. The insulating rings 30 may be formed to have an outside diameter equal to the slip rings 29, or as shown in FIG. 9, the insulating rings 30 can have a larger outside diameter than the slip rings, thereby substantially defining a shoulder member between the respective slip rings. The advantage of forming the insulating rings 30 to define shoulders with a slip ring 29 therebetween, is that these shoulders will serve to guide the brushes which will ultimately contact the respective slip rings 29 during use of the assembly.

Hence, it is seen that the resultant slip-ring assembly is comprised of a plurality of lead wires 10 grouped together substantially side-by-side and extending longitudinally with their respective end portions from one end region of the group extending outwardly from the group and axially spaced substantially equidistant from each other. A substantially tubular thin-walled reinforcing member 14 is provided about the lead wires 10 with their end portions extending through the openings 15 therein. Solidified about the wires 10 and the reinforcing member 14 to hold the wires and the reinforcing member in their proper described relationship is a dielectric substrate cylindrical body member 23 of substantially uniform diameter. Slip rings 29 are circumferentially disposed about the body member 23 and are electrically connected to the wire ends. The slip rings 29 are also axially spaced from each other. A conductive wire 25 is wound about the substrate body member 23 between the body member and the slip rings, and insulating rings 30 are disposed about the substrate body member between the respective slip rings. It has been found that an assembly as described has superior strength as evidenced by the fact that such assemblies experienced no measurable distortion after being subjected to temperatures of 192° C. for up to 18 hrs.

A second embodiment of the invention is shown in detail in FIGS. 10–23. In this embodiment, as shown in FIG. 10, the lead wire 31 used consists of a conductor 32 which has a jacket 33 covering the conductor along the majority of its length but is stripped free of the jacket along its end portion 34. This end portion 34 of the exposed conductor 32 is coated or served with a suitable insulation 35 (as shown in FIG. 19). The wires are grouped together side-by-side as shown in FIG. 11 and are placed in a split mold 36 which serves to define a stepped diametric axial bore. A first portion 37 of the bore is adapted to hold a collar 38 tightly about the grouped wires substantially at the point where the jacket 33 terminates. The collar 38 has been threaded onto the grouped wires prior to placing them in the mold. The non-jacketed end portions of the wires extend out from the collar 38 and into a second portion 39 of the bore. Extending radially outward from the second portion 39 are a plurality of axially spaced positioning slots 40. The end portions 34 of the wires 31 are bent outwardly from the grouped wires and are placed in the slots 40. The mold is then closed substantially as shown in FIG. 12 and a dielectric material of any of the types described above is injected into the second portion 39 through a third portion 41 of the bore formed at the end of the mold 36 opposite to the end in which the first portion 37 is formed.

As shown in FIG. 13, after the dielectric material is cured and removed from the mold 36, it defines an inner portion 42 of the substrate body member and maintains the wires grouped as positioned with the end portions 34 extending radially outward therefrom. The positioning of the end portions 34 of the wires 31 is such that they extend outwardly from the groove in diametrically opposed sides thereof with each of the outwardly extending end portions 34 being axially spaced substantially equidistant from each outwardly extending end portion on the same side, as well as each outwardly extending portion on the diametrically opposed side thereof. With the wires thus arranged, the assembly is submitted to a second dielectric coating operation wherein a more substantial deposit of a dielectric material is formed about the first portion 42 of the substrate body member and about the outwardly extending wires 34 substantially as shown in FIG. 14. The thus-coated assembly is then turned down to a small diameter thereby providing an outer portion 43 of the substrate body member 44. As noted in FIG. 16, an end 45 of the conductor 32 is exposed at the surface of the substrate body member 44. It is well to note that it is also contemplated that the substrate body member 44 could be formed in a single operation by utilizing a mold such as described with relation to FIG. 3 in the first embodiment.

It is well to note that a reinforcing member could be formed on the inner portion 42 of the substrate body member as shown in FIG. 15. This method would consist of coating the inner portion 42 with a conductive coating, leaving holes in this coating in the immediate area of the end portions 34. The reinforcing material would then be electro-deposited to the desired thickness on this coating, and the assembly is completed in the manner to be described. This coating may be applied in many ways but painting with a conductive paint would be most practical.

Figure 17:
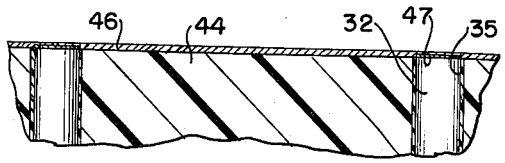
FIG. 17 is an enlarged fragmentary section of the assembly showing a conductive surface on the substrate body member.

In order to electrodeposit a substantial thickness of slip-ring material such as gold or silver on the assembly, it is necessary to provide a conductive surface along the longitudinal extent of the assembly upon which the ring material can be deposited. Among the available methods of forming this conductive surface are immersion-plating, vacuum-depositing, metal-spraying, painting with conductive paint or soldering the substrate body member 44 with a small layer of a conductive coating 46 as shown in FIG. 17. It has been found however that in these processes, such as immersion-plating, the exposed lead wire ends 45, which are usually formed from copper, are often corroded during the immersion-coating operation and thereby provide a poor electrical contact during subsequent use. For this reason, as shown in FIG. 16, it is often desirable to electro-deposit onto the exposed end portion 32 of the conductor a small deposit of material similar to the slip-ring material in order to form a protective cap 47 thereon.

Figure 18:
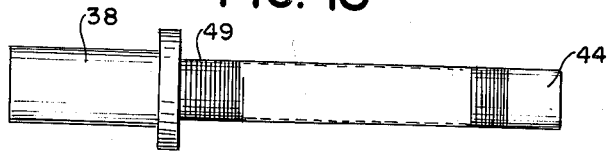
FIG. 18 is a side elevation of the assembly showing a conductive surface formed on the substrate body member with a helically wound electrically conductive wire.
Figure 19:
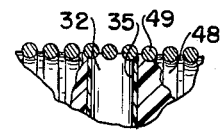
FIG. 19 is an enlarged fragmentary section partly broken away showing the electrically conductive helically wound wire of FIG. 18 disposed in closely spaced grooves.
Figure 20:
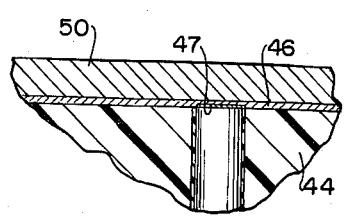
FIG. 20 is an enlarged fragmentary section of the conductive surface of FIG. 17 with slip-ring material electrodeposited thereon.
Figure 21:
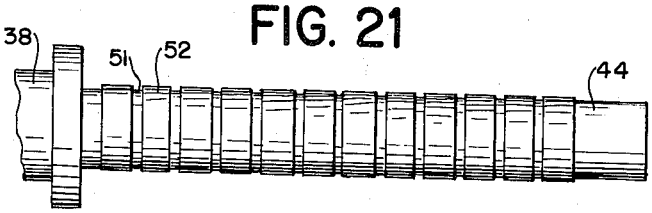
FIG. 21 is a side elevation of the assembly showing axially spaced slip rings formed on the body member by cutting circumferential grooves through the ring material between adjacent wire ends to expose the substrate coating.

As an alternative to providing this conductive surface by the manner described above, it is also contemplated that such a surface can satisfactorily be formed thereon by cutting a continuous closely spaced helical groove 48 into the substrate body member 44 as shown in FIG. 18 and FIG. 19. A small-diameter conductive wire 49 is then served onto the substrate body member 44 into groove 48 so that at least one turn will contact the exposed end portion of the conductor 32. As shown in FIG. 19 it is often possible to contact this exposed end portion of the conductor 32 with as many as three turns of the wire 49.

After providing the conductive surface, the lead wires 34 are used as the cathode connection and a deposit of slip-ring material 50 is formed about the longitudinal extent of the assembly. Then, circumferential grooves 51 are cut through the slip-ring material 50 and the wires 49 between adjacent wire ends to expose the substrate body member. By so cutting the assembly, slip rings 52 are defined which are axially spaced from each other.

Figure 22:
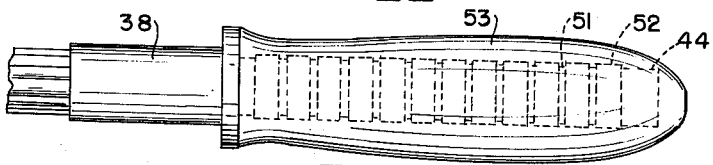
FIG. 22 is a side elevation of the assembly of FIG. 21 after it has been coated with a dielectric material.
Figure 23:
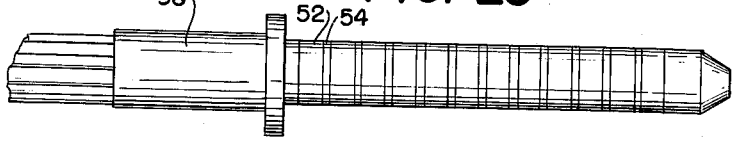
FIG. 23 is a side elevation of the finished slip-ring assembly.

The thus-formed assembly is then submitted to a coating operation, as shown in FIG. 22, in which a deposit of dielectric material 53 is formed over the entire assembly. The dielectric material is deposited within the grooves 51 in order to insulate the slip rings 52 from each other. After depositing the dielectric material 53 on the assembly, the assembly is then turned down to a smaller diameter such that the finished slip-ring assembly is composed of a plurality of axially spaced slip rings 52 which are separated by insulating rings 54. The insulating rings 54 can be of the same outside diameter as the slip rings 52 (as shown in FIG. 23), or can have a greater outside diameter such as shown and described above in relation to FIG. 9.

Thus, the resultant slip-ring assembly of the second embodiment is comprised of a plurality of lead wires 31 grouped together side-by-side and extending longitudinally with their respective end portions 34 extending outwardly from the group and spaced axially and substantially equidistant from each other. A substantially cylindrical dielectric substrate body member 44 is solidified about the wires to hold them in their described relationship with the ends 45 of the wires 31 exposed at the surface thereof. Slip rings 52 are circumferentially mounted about said body member 44 and are electrically connected to the wire ends 45. A conductive surface 46 is disposed between each slip ring 52 and the underlying substrate body member 44. Insulating rings 51 are disposed about the substrate member 44 between the respective slip rings 52.

Although the two methods have been described separately, it is not intended that novel steps of the invention (e.g. the manner of providing the reinforcing member and forming the conductive surface) can not be used interchangeably in the different methods described, as well as in other similar methods of forming slip-ring assemblies.

The invention has been described above with particular reference to slip-ring assemblies. It is of course readily apparent that the invention is equally applicable to commutators and other devices for making electrical connections between relatively rotatable members. The term "slip-ring" is therefore used herein and in the appended claims to include all such devices.

We claim:
1. A method of making miniature slip-ring assemblies comprising:
 (a) grouping a plurality of insulated lead wires together substantially side-by-side such that the group along one end region is defined only by said lead wires,
 (b) extending the end portions of said wires outwardly from said end region of the group such that said end portions are spaced axially from each other,
 (c) applying a dielectric substrate coating to said end region of the group,
 (d) reducing said end region and wires to a cylindrical member of substantially uniform diameter such that the ends of said wires are exposed at the surface of said cylindrical member,
 (e) applying a conductive surface on said cylindrical member,
 (f) electrodepositing slip-ring material on said conductive surface, and
 (g) cutting circumferential grooves through said slip-ring material and said conductive surface material between adjacent wire ends to expose the substrate and thus form slip rings circumferentially disposed about the body member and electrically connected to the respective wires, and
 (h) filling said grooves with a dielectric material to form insulating rings.

2. A method as in claim 1 wherein a conductive material is electrodeposited on the wire ends exposed at the surface of the cylindrical member and a conductive surface is then applied on the cylindrical member by immersion coating.

3. A method as in claim 1 wherein the end portions of the wires extend substantially normal to the axial extent of the group and are axially spaced substantially equidistant from each other.

4. A method as in claim 1 wherein a closely spaced helical groove is cut into the substrate cylindrical member, and an electrically conductive wire is wound in the helical groove to form a conductive surface thereon.

5. A method of making miniature slip-ring assemblies comprising:
(a) grouping a plurality of insulated lead wires together substantially side-by-side such that the group along one end region is defined only by said lead wires,
(b) containing the grouped wires in a substantially tubular thin-walled reinforcing member of at least one piece,
(c) extending the end portions of said wires outwardly from said end region of the group and through the reinforcing member such that said end portions are spaced axially from each other,
(d) applying a dielectric substrate coating to said end region of the group and about the reinforcing member,
(e) reducing said end region and said wires to a cylindrical member of substantially uniform diameter such that the ends of said wires are exposed at the surface of said cylindrical member,
(f) applying a conductive slip-ring material on said cylindrical member,
(g) cutting circumferential grooves through said material between adjacent wire ends to expose the substrate coating and thus form slip rings circumferentially disposed about the body member and electrically connected to the respective wires, and
(h) filling said grooves with a dielectric material to form insulating rings.

6. A method as in claim 5 wherein a conductive surface is first applied to the cylindrical member and slip-ring material is then electrodeposited on said conductive surface.

7. A method as in claim 5 wherein a conductive material is electrodeposited on the wire ends exposed at the surface of the cylindrical member and a conductive surface is then applied on the cylindrical member by immersion coating.

8. A method as in claim 5 wherein the said end portions extend substantially normal to the axial extent of the group and are axially spaced substantially equidistant from each other.

9. A method as in claim 5 wherein a closely spaced helical groove is cut into the substrate cylindrical member after reducing said end region with the dielectric substrate coating thereon to said cylindrical member, and an electrically conductive wire is wound in the helical groove to form a conductive surface thereon on which said conductive slip-ring material can be applied.

References Cited by the Examiner
UNITED STATES PATENTS

| | | | |
|---|---|---|---|
| 2,316,652 | 4/1943 | Moeller | 310—235 |
| 2,473,526 | 6/1949 | Hood et al. | 339—5 |
| 2,551,030 | 5/1951 | Madden | 310—232 |
| 2,696,570 | 12/1954 | Pandapas | 29—155.54 |
| 2,786,985 | 3/1957 | Merete. | |
| 2,798,210 | 7/1957 | Keitel | 339—5 |
| 2,924,800 | 2/1960 | Scarborough | 310—232 |
| 2,961,385 | 11/1960 | McGall | 310—232 |
| 2,967,283 | 1/1961 | Medney | 29—155.54 |
| 3,005,173 | 10/1961 | Aske | 310—232 |
| 3,014,193 | 12/1961 | Schiller | 310—232 X |
| 3,042,998 | 7/1962 | Sweett et al. | 29—155.54 |
| 3,066,386 | 12/1962 | Filipczak | 29—155.54 |
| 3,123,787 | 3/1964 | Shifrin | 29—155.56 X |

WHITMORE A. WILTZ, *Primary Examiner.*

BERNARD A. GILHEANY, ALFRED S. TRASK, *Examiners.*